(12) United States Patent
Jeon et al.

(10) Patent No.: US 9,694,708 B2
(45) Date of Patent: Jul. 4, 2017

(54) BATTERY ASSEMBLY AND HYBRID ELECTRIC VEHICLE INCLUDING THE SAME

(71) Applicants: Hyundai Motor Company, Seoul (KR); Kia Motors Corporation, Seoul (KR)

(72) Inventors: Yooncheol Jeon, Gyeonggi-Do (KR); Jeong Hun Seo, Gyeonggi-Do (KR); Yongjin Lee, Gyeonggi-Do (KR); Hae Kyu Lim, Gyeonggi-Do (KR); Jin Ho Park, Seoul (KR); Jun Seok Choi, Gyeonggi-Do (KR); Jun Ho Bang, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 368 days.

(21) Appl. No.: 14/468,754

(22) Filed: Aug. 26, 2014

(65) Prior Publication Data
US 2015/0165927 A1    Jun. 18, 2015

(30) Foreign Application Priority Data

Dec. 12, 2013 (KR) ........................ 10-2013-0154972

(51) Int. Cl.
*B60L 11/18*   (2006.01)
*B60L 3/00*    (2006.01)
(Continued)

(52) U.S. Cl.
CPC ......... *B60L 11/1872* (2013.01); *B60L 3/0046* (2013.01); *B60L 3/04* (2013.01); *B60L 11/14* (2013.01); *B60L 11/1862* (2013.01); *B60L 11/1864* (2013.01); *B60L 11/1877* (2013.01); *H01M 2/345* (2013.01); *B60L 2240/545* (2013.01); *B60L 2240/547* (2013.01);
(Continued)

(58) Field of Classification Search
CPC ...... B60L 11/1872; B60L 3/0046; B60L 3/04; B60L 11/14; B60L 11/1862; B60L 11/1864; B60L 11/1877; B60L 2240/545; B60L 2240/547; B60L 2240/549; H01M 2/345; Y02T 10/70; Y02T 10/7077
See application file for complete search history.

(56) References Cited

U.S. PATENT DOCUMENTS 7,510,798 B2   3/2009   Masuda et al.
8,148,946 B2   4/2012   Takeda et al.
(Continued)

FOREIGN PATENT DOCUMENTS

KR   1020090052802       5/2009
KR   10-2009-0113521 A   11/2009

*Primary Examiner* — Jared Fureman
*Assistant Examiner* — James Evans
(74) *Attorney, Agent, or Firm* — Mintz Levin Cohn Ferris Glovsky and Popeo, P.C.; Peter F. Corless

(57) ABSTRACT

A battery assembly mounted on a hybrid electric vehicle is provided that prevents thermal runaway caused by overcharging. The battery assembly includes a battery having a plurality of cells and a protection switch disposed opposite to the battery. A relay is configured to turn on or off according to an operation of the protection switch and a PRA (power relay assembly) is connected between the relay and the battery.

5 Claims, 4 Drawing Sheets

(51) Int. Cl.
*B60L 3/04* (2006.01)
*B60L 11/14* (2006.01)
*H01M 2/34* (2006.01)

(52) U.S. Cl.
CPC ......... *B60L 2240/549* (2013.01); *Y02T 10/70* (2013.01); *Y02T 10/7005* (2013.01); *Y02T 10/7044* (2013.01); *Y02T 10/7061* (2013.01); *Y02T 10/7077* (2013.01)

(56) References Cited

U.S. PATENT DOCUMENTS

| | | | |
|---|---|---|---|
| 2011/0089904 A1* | 4/2011 | Ward | B60L 8/003 320/126 |
| 2013/0264994 A1 | 10/2013 | Schaefer | |
| 2014/0002269 A1* | 1/2014 | Zhou | H01M 10/482 340/636.11 |
| 2015/0000991 A1* | 1/2015 | Lim | H01M 2/34 180/65.31 |

* cited by examiner

BATTERY ASSEMBLY AND HYBRID ELECTRIC VEHICLE INCLUDING THE SAME

CROSS-REFERENCE TO RELATED APPLICATION

This application claims priority to and the benefit of Korean Patent Application No. 10-2013-0154972 filed in the Korean Intellectual Property Office on Dec. 12, 2013, the entire contents of which are incorporated herein by reference.

BACKGROUND (a) Field of the Invention

The present invention relates to a battery assembly. More particularly, the present invention relates to a battery assembly mounted on a hybrid electric vehicle that prevents a thermal runaway caused by overcharging.

(b) Description of the Related Art

In general, a high voltage battery is used in a hybrid electric vehicle or an electric vehicle as a power source. The high voltage battery is mounted on a vehicle in a form of one pack by connecting about 50 to 100 cells in series according to a necessary capacity of the battery. When the battery cell is overcharged, swelling of the battery cell occurs due to the internal temperature of the battery cell increasing and a pore of a separator disposed between a positive electrode and a negative electrode of the battery cell closes. The internal temperature of the battery cell then continues to increase causing thermal runaway. Consequently, the hybrid electric vehicle having the battery pack may incur a safety problem.

Particularly, the hybrid electric vehicle should prevent overcharging of the battery when an amount of regenerative braking of greater than a battery capacity is generated from a motor. According to a conventional art, the battery can prevent overcharging by breaking a lead tab when the swelling of the battery cell occurs. However, the lead tab is thickened when the battery cell has a substantially high capacity, thus causing a problem with breaking the lead tab of the battery cell. When the lead tab is not broken, the thermal runaway occurs according to a chemical reaction within the battery cell.

The above information disclosed in this section is merely for enhancement of understanding of the background of the invention and therefore it may contain information that does not form the prior art that is already known in this country to a person of ordinary skill in the art.

SUMMARY

The present invention provides a battery assembly and hybrid electric vehicle including the same having advantages of preventing thermal runaway caused by overcharging.

An exemplary embodiment of the present invention provides a battery assembly that may include: a battery including a plurality of cells; a protection switch disposed opposite to the battery; a relay configured to turn on or off according to an operation of the protection switch; and a PRA (power relay assembly) connected between the relay and the battery.

The protection switch may be configured to turn on and the relay may be configured to turn off when swelling occurs due to overcharging of the battery. One end of the protection switch may be connected to an input and output terminal, and the relay may be connected between the PRA and the input and output terminal. The other end of the protection switch may be connected to one end of an inductor of the relay, the other end of the inductor may be connected to a ground, and the relay may be configured to turn off when a current flows through the inductor due to turning on of the protection switch.

Another exemplary embodiment of the present invention provides a hybrid electric vehicle that may include a motor configured as a power source and a battery assembly connected to the motor, and the battery assembly may include a battery that includes a plurality of cells, a protection switch disposed opposite to the battery, a relay configured to turn on or off according to an operation of the protection switch, and a PRA (power relay assembly) connected between the relay and the battery.

The protection switch may be configured to turn on and the relay may be configured to turn off when swelling occurs due to overcharging of the battery. The battery assembly may be charged by supplying power from the motor according to regenerative braking. One end of the protection switch may be connected to the motor, and the relay may be connected between the PRA and the motor. The other end of the protection switch may be connected to one end of an inductor of the relay, and the other end of the inductor may be connected to a ground. The relay may be configured to turn off when a current flows through the inductor due to turning on of the protection switch.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Figure 1:
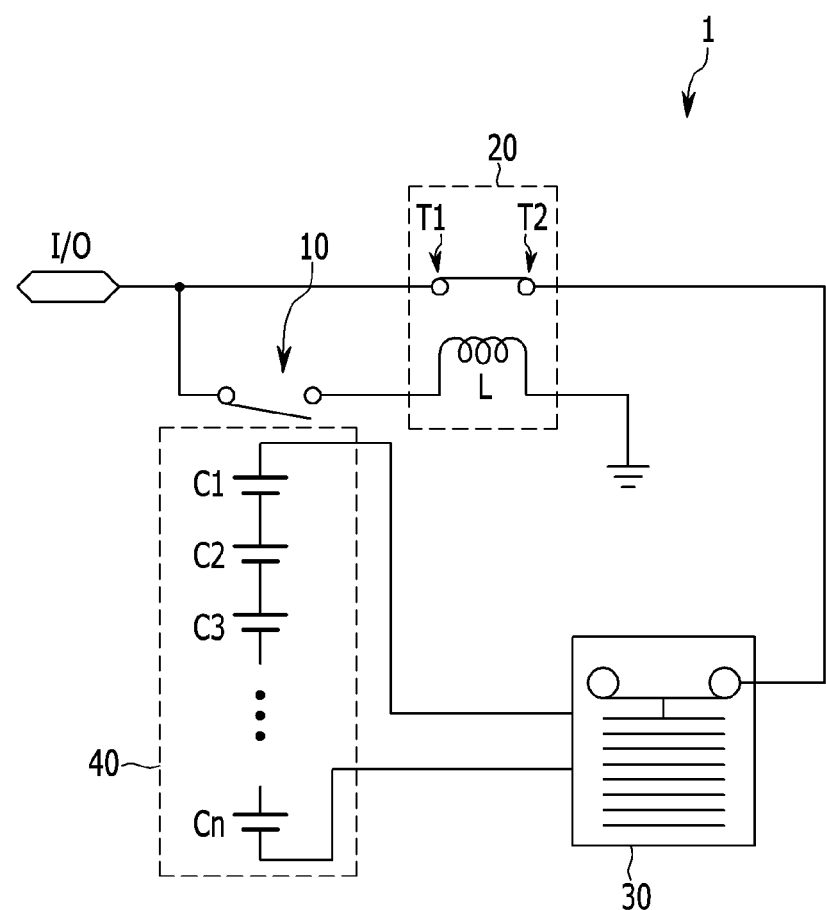
FIG. 1 is an exemplary schematic circuit diagram of a battery assembly according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In the following detailed description, only certain exemplary embodiments of the present invention have been shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

In the present specification and the claims, it will be appreciated that an electric vehicle includes all vehicles using electricity as a power source, such as a plug-in hybrid electric vehicle (PHEV) or a hybrid electric vehicle (HEV) using electricity as a part of a power source, as well as an electric vehicle (EV) using electricity as the entirety of a power source.

Hereinafter, an exemplary embodiment of the present invention will be described in detail with reference to the accompanying drawings. FIG. 1 is an exemplary schematic circuit diagram of a battery assembly according to an exemplary embodiment of the present invention.

A battery assembly 1 according to an exemplary embodiment of the present invention may include a protection switch 10, a relay 20, a PRA (power relay assembly) 30, and a battery 40. The battery 40 may include a plurality of cell C1-Cn connected in series. An input and output terminal I/O of the battery assembly 1 may be connected to the protection switch 10 and the relay 20. The protection switch 10 may be disposed opposite to the battery 40 and may be configured to be turned on when swelling of the battery 40 occurs. For example, a distance between the protection switch 10 and the battery 40 may be determined according to a degree of the swelling caused by overcharging. In particular, the protection switch 10 may be designed to be pushed by the battery 40 and be turned on when the volume of the battery 40 increases by a predetermined threshold value according to the swelling. One end (e.g., a first end) of the protection switch 10 may be connected to an input and output terminal I/O, and the other end (e.g., a second end) of the protection switch 10 may be connected to one end (e.g., a first end) of an inductor L of the relay 20.

The relay 20 may be turned off when a current flows through the inductor L and may be turned on when the current is prevented from flowing through the inductor L. One end T1 (e.g., a first end) of the relay 20 may be connected to the input and output terminal I/O, and the other end T2 (e.g., a second end) of the relay 20 may be connected to the PRA 30. The other end (e.g., a second end) of the inductor L may be connected to a ground. Therefore, the relay 20 may be turned on or off according to a switching operation of the protection switch 10. The protection switch 10 may be operated by a controller.

The PRA 30 may include an assembly of a plurality of relays such as a charging relay and a main contact relay, and on the like. When the charging relay is turned on, the battery 40 may be charged by a current supplied from an alternator of the vehicle. When the main contact relay is turned on, the battery 40 may be connected to a power supply device of the vehicle (not shown) such as an inverter or a converter for supplying power to the vehicle. Therefore, the power supply device of the vehicle may be configured to receive electric power from the battery 40.

The battery 40 may be charged by a current supplied from the exterior through the PRA 30, or may supply power through the PRA 30. Although not shown in FIG. 1, the PRA 30 may be operated by a battery management system (e.g., a controller of a battery management system). However, an exemplary embodiment of the present invention is not limited thereto, and power without the PRA 30 may be input or output even though this is not shown in FIG. 1. When the protection switch 10 is turned on due to the swelling of the battery 40, a current may flow through the inductor L and the relay 20 may be turned off. The PRA 30 may then enter an open state. In addition, the input and output terminal I/O may be connected to the ground via the protection switch 10.

Therefore, the battery assembly 10 according to an exemplary embodiment of the present invention may not be charged even though a charging current caused by regenerative braking is flowing to the battery assembly 10. The relay 20 may be turned on and the protection switch 10 may be turned off in a normal state of the battery 40 (e.g., when overcharging is not occurring), to allow the battery 40 to operate according to an operation of the PRA 30. For example, the battery 40 may be charged by a current supplied through the relay 20 and the PRA 30.

Figure 2:
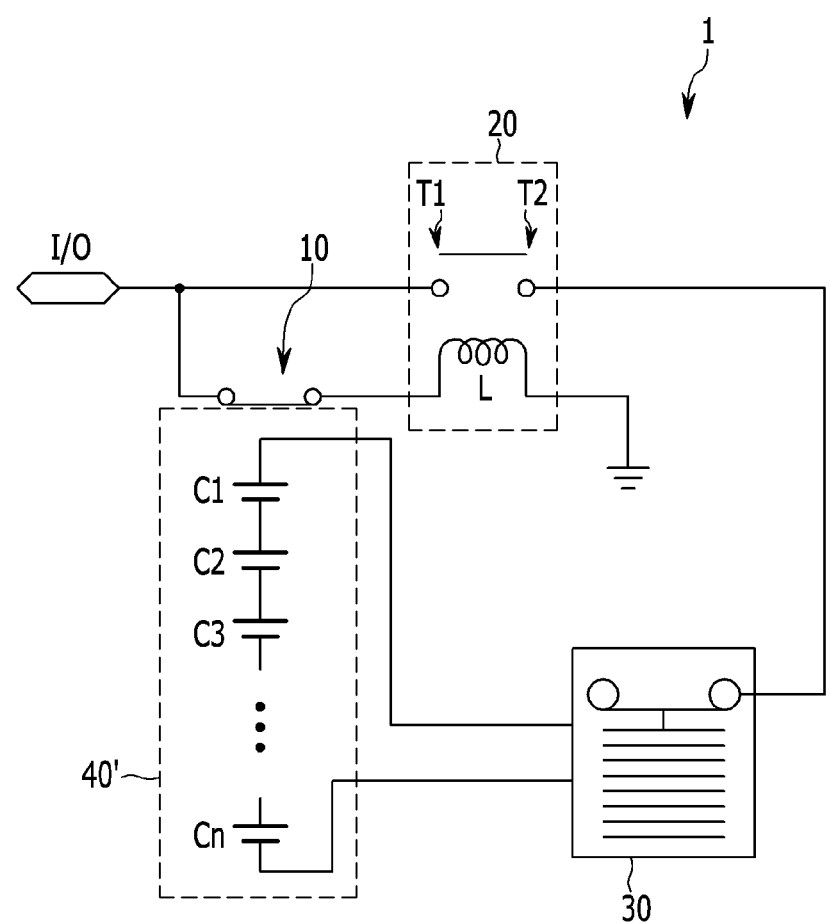
FIG. 2 is an exemplary schematic circuit diagram of a battery in which swelling caused by overcharging occurs according to an exemplary embodiment of the present invention.

FIG. 2 is an exemplary schematic circuit diagram of a battery which undergoes swelling caused by overcharging. As shown in FIG. 2, the protection switch 10 may be turned on by a battery 40' which undergoes swelling caused by overcharging. The relay 20 may then be turned off and the PRA 30 may enter an open state, to block a current output from the battery 40. Thus, the input and output terminal I/O may be connected to ground.

Figure 3:
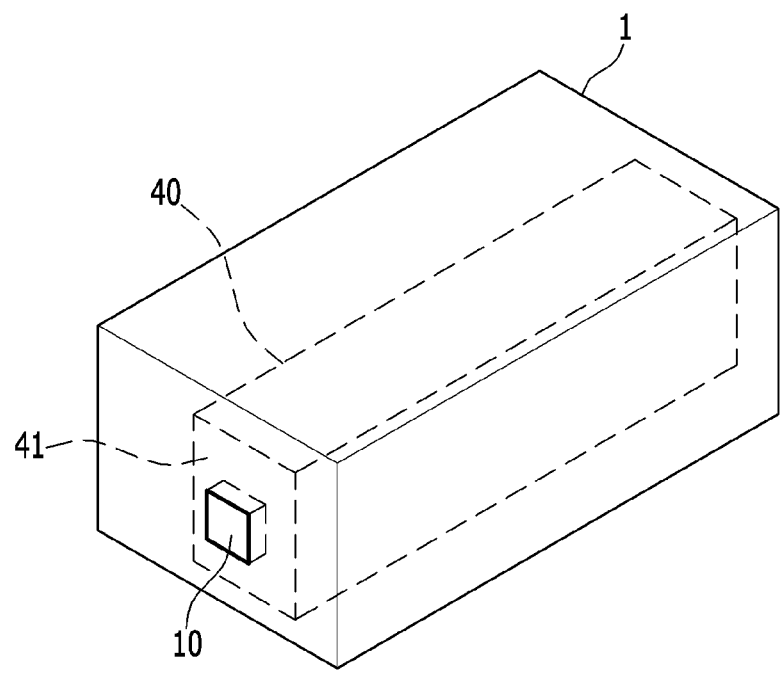
FIG. 3 is an exemplary view of a battery assembly according to an exemplary embodiment of the present invention.

FIG. 3 is an exemplary view of a battery assembly according to an exemplary embodiment of the present invention. As shown in FIG. 3, the protection switch 10 may be mounted on an endplate 41 of the battery 40. When the swelling of the battery 40 occurs, the protection switch 10 mounted on the endplate 41 of the battery 40 may be turned on due to a load of the swelling. The protection switch 10 disposed opposite to the positive and negative poles of the battery cell that is shown in FIG. 1 may be an exemplary embodiment for better understanding of the present invention. Therefore, the protection switch 10 may be disposed diversely considering a direction of the swelling caused by overcharging of the battery.

Figure 4:
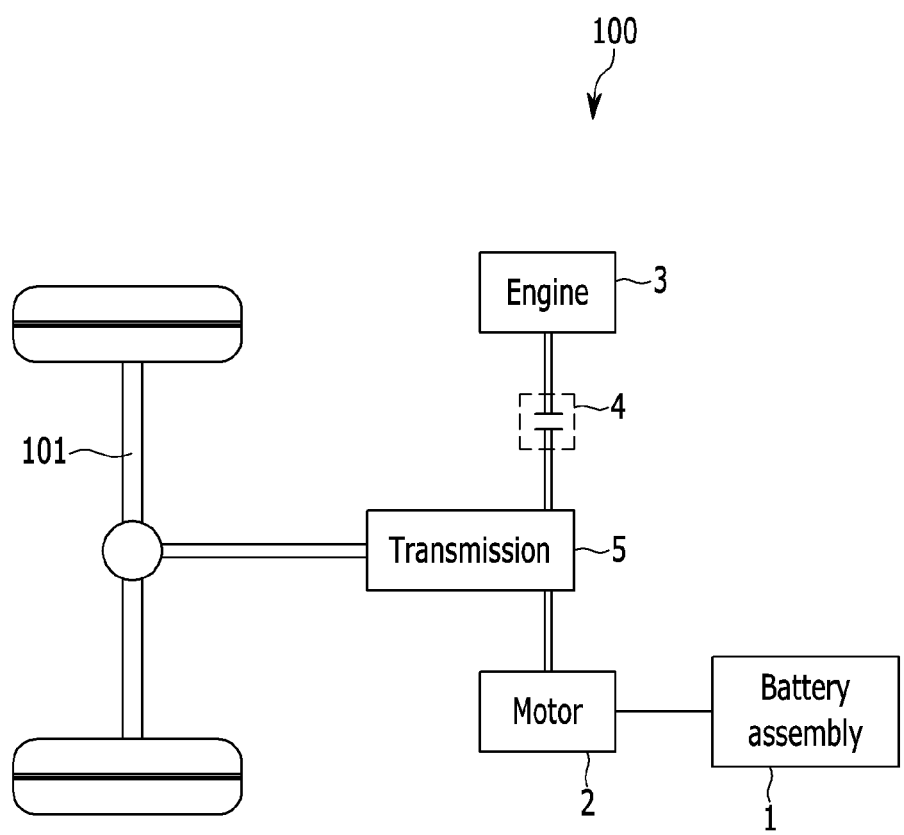
FIG. 4 is an exemplary block diagram of a hybrid electric vehicle system applied to the battery assembly according to an exemplary embodiment of the present invention.

FIG. 4 is an exemplary block diagram of a hybrid electric vehicle system applied to the battery assembly according to an exemplary embodiment of the present invention. A hybrid electric vehicle 100 may include a battery assembly 1, a motor 2, an engine 3, an engine clutch 4, and a transmission 5.

The battery assembly 1 may be connected to the motor 2, to supply power to the motor 2. The battery assembly 1 may be charged by regenerative power generated from the motor 2. The input and output terminal I/O as shown in FIG. 1 may be connected to the motor 2. In addition, when the swelling occurs due to overcharging of the battery assembly 1, charging may be blocked by the protection switch 10 of the battery assembly 1. The motor 2 may be mechanically connected to the transmission 5 via a shaft 25, to transmit power output from the motor 2 to the transmission 5. Power output from the engine 3 may be transmitted to the transmission 5 via the engine clutch 4. The transmission 5 may be connected to a driving shaft 101 and may be configured to transmit power to the driving shaft 101 connected to a wheel of the vehicle.

According to an exemplary embodiment of the present invention with reference to the accompanying drawings, the present invention provides a battery assembly and a hybrid electric vehicle that may block charging by detecting swelling of the battery. However, in a conventional art, the battery may be prevented from overcharging by breaking an electrode tab when the swelling of the battery cell occurs. However, gas pressure for breaking the electrode tab does not occur below a predetermined temperature. Therefore, although sufficient gas pressure occurs above the predetermined temperature, a short circuit between electrodes within the battery cell occurs due to a separator of the battery cell melting due to a high temperature. Therefore, thermal runaway and a safety problem occur in the related art.

An exemplary embodiment of the present invention does not require gas pressure for breaking an electrode tab and merely requires a volume expansion for turning on the protection switch. Thus, according to an exemplary embodiment of the present invention, the problem that the electrode tab is not broken at a low temperature may be eliminated.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the accompanying claims.

DESCRIPTION OF SYMBOLS

100: hybrid electric vehicle
1: battery assembly
2: motor
3: engine
4: engine clutch
5: transmission
10: protection switch
20: relay
30: PRA (power relay assembly)
40: battery
C1-Cn: cells

What is claimed is:

1. A battery assembly, comprising:
a battery that includes a plurality of cells;
a protection switch disposed opposite to the battery;
a relay configured to turn on or off according to an operation of the protection switch; and
a PRA (power relay assembly) connected between the relay and the battery,
wherein the protection switch is turned on and the relay is turned off when swelling occurs due to overcharging of the battery,
wherein a first end of protection switch is connected to an input and output terminal and the relay is connected between the PRA and the input and output terminal.

2. The battery assembly of claim 1, wherein a second end of the protection switch is connected to a first end of an inductor of the relay, a second end of the inductor is connected to a ground, and the relay is turned off when a current flows through the inductor due to the protection switch being turned on.

3. A hybrid electric vehicle, comprising:
a motor configured as a power source; and
a battery assembly connected to the motor, wherein the battery assembly includes
a battery that includes a plurality of cells,
a protection switch disposed opposite to the battery,
a relay configured to turn on or off according to a switching operation of the protection switch, and
a PRA (power relay assembly) connected between the relay and the battery, wherein the protection switch is turned on and the relay is turned off when swelling occurs due to overcharging of the battery,
wherein a first end of the protection switch is connected to the motor and the relay is connected between the PRA and the motor.

4. The hybrid electric vehicle of claim 3, wherein the battery assembly is charged by supplying power from the motor according to regenerative braking.

5. The hybrid electric vehicle of claim 3, wherein a second end of the protection switch is connected to a first end of an inductor of the relay, a second end of the inductor is connected to a ground, and the relay is turned off when a current flows through the inductor due to the protection switch being turned on.

* * * * *